United States Patent
Karve et al.

(10) Patent No.: US 11,099,907 B1
(45) Date of Patent: Aug. 24, 2021

(54) PREREQUISITE DRIVEN DYNAMIC INFRASTRUCTURE ORCHESTRATION

(71) Applicant: International Business Machines Corporation, Armonk, NY (US)

(72) Inventors: Alexei Karve, Mohegan Lake, NY (US); Matthew Staffelbach, White Plains, NY (US); Ameya Tayade, White Plains, NY (US); Ramesh S Palakodeti, Cumming, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/817,795

(22) Filed: Mar. 13, 2020

(51) Int. Cl.
*G06F 9/46* (2006.01)
*G06F 9/50* (2006.01)

(52) U.S. Cl.
CPC .................... *G06F 9/5055* (2013.01)

(58) Field of Classification Search
CPC ........................................................ G06F 9/5055
See application file for complete search history.

(56) References Cited

U.S. PATENT DOCUMENTS

| | | | |
|---|---|---|---|
| 8,448,170 B2 | 5/2013 | Wipfel et al. | |
| 9,052,961 B2 | 6/2015 | Mangtani et al. | |
| 10,140,134 B2 | 11/2018 | Dunning et al. | |
| 10,261,769 B2 | 4/2019 | Govindaraju et al. | |
| 10,282,200 B2 | 5/2019 | Raghavan et al. | |
| 10,284,685 B2 | 5/2019 | Bauer et al. | |
| 2013/0232480 A1 | 9/2013 | Winterfeldt et al. | |
| 2013/0232497 A1 | 9/2013 | Jalagam et al. | |
| 2013/0232498 A1 | 9/2013 | Mangtani et al. | |
| 2014/0075032 A1 | 3/2014 | Vasudevan et al. | |
| 2014/0223001 A1 | 8/2014 | Byrne et al. | |
| 2015/0304175 A1 | 10/2015 | Maes et al. | |
| 2016/0239595 A1 | 8/2016 | Maes et al. | |
| 2017/0351535 A1 | 12/2017 | Mao et al. | |
| 2018/0165158 A1 | 6/2018 | Raghavan et al. | |
| 2019/0190798 A1 | 6/2019 | Asthana et al. | |

OTHER PUBLICATIONS https://osgi.org/specification/osgi.cmpn/7.0.0/service.blueprint.html; May 2019.
Baker, Steve, "Application Software Configuration Using Heat", https://www.openstack.org/assets/presentation-media/heat-software-config.pdf; Feb. 26, 2019.

(Continued)

*Primary Examiner* — Gregory A Kessler
(74) *Attorney, Agent, or Firm* — Lieberman & Brandsdorfer, LLC

(57) ABSTRACT

A system, computer program product, and method are provided for dynamically orchestrating a prerequisite driven codified infrastructure. A prerequisite defines deployment of one or more resources in the codified infrastructure through the use of a codified logic expression. One or more probes are created and leveraged to monitor a dynamic resource state for one or more prerequisites. A new codified infrastructure is generated based on the change(s) to the monitored dynamic resource state for the one or more prerequisites. The identified one or more changes are applied to the new codified infrastructure and the new codified infrastructure is executed based on the applied change(s).

20 Claims, 10 Drawing Sheets

(56) References Cited

OTHER PUBLICATIONS

Hardy, Steve, "Heat SoftwareConfig resources—primer/overview", http://hardysteven.blogspot.com/2015/05/heat-softwareconfig-resources.html; 2015.

VMware vRealize Automation Documentation; vRealize Automation 7.6 Release Notes; https://docs.vmware.com/en/vRealize-Automation/index.html?topic=%252Fcom.vmware.vra.iaas.cloud.doc%252FGUID-6777BE03-F574-4287-8662-761E38105F04.html; Apr. 11, 2019.

"Enterprise Manager Cloud Administration Guide", https://docs.oracle.com/cd/E24628_01/doc.121/e28814/blueprint.htm#EMCLO1910; Jun. 2015.

PREREQUISITE DRIVEN DYNAMIC INFRASTRUCTURE ORCHESTRATION

BACKGROUND

The present embodiment(s) relate to incorporating logical expressions for prerequisites within a codified infrastructure, referred to as a blueprint. More specifically, probes are created and utilized to monitor a resource state associated with one or more prerequisites, and operating coupled to an orchestration engine to deploy one or more corresponding resources responsive to the monitored resource state.

A codified infrastructure also referred to herein as a blueprint, is a collection of elements that define an overall landscape of an information project and of associated standard practices. The blueprint represents an architecture of an application or infrastructure, which includes attributes of a machine, the manner in which it is provisioned, and its policy and management settings. For example, the blueprint may be created for provisioning machines in a cloud computing environment in which the blueprint is used to describe a set of inter-related cloud resources and how they are to be configured to support interaction. The blueprint is a declarative representation of a workload that is both human and machine readable. The blueprint describes what resources will be created and corresponding resource properties. Blueprints define one or more resources to create, and define relationships and dependencies between the defined resources. Dependencies can be implicitly inferred in the blueprint or explicitly defined. The dependencies between resources ensure that they are created in the correct order. The blueprint is a re-usable asset configured for repeated use.

The blueprint, however, does not describe how to build, e.g. construct, the architecture, such as the order in which the components are created. An orchestration engine interprets the blueprint, determines dependencies among resources, and instantiates the resources. Based on resource dependencies, the orchestration engine automatically establishes an optimal execution path. Accordingly, the blueprint focuses on declaration of resources to include, and the orchestration engine addresses instantiation of these resources.

Current use of the blueprint and architecture management is static. As changes to the infrastructure take place, the blueprint does not adjust to the infrastructure changes. The blueprint needs to be modified and re-deployed to support infrastructure changes. Accordingly, there is a need to resolve the limitations present in blueprint provisioning that supports infrastructure modifications.

SUMMARY

The embodiments include a system, computer program product, and method for dynamic infrastructure management and processing, including embedding and encoding one or more prerequisites within the infrastructure, and subjecting a corresponding launched architecture to dynamic management responsive to changes to probed resource states.

In one aspect, a computer system is provided with a processing unit operatively coupled to a memory, and a knowledge engine operatively coupled to the processing unit and memory. The knowledge engine is configured with tools in the form of a prerequisite manager, a probe manager, and an orchestration manager configured with functionality to dynamically orchestrate a prerequisite driven codified infrastructure. The prerequisite manager is configured to receive a codified infrastructure that has one or more prerequisites. The probe manager is operatively coupled to the prerequisite manager, and is configured to create one or more probes to monitor a dynamic resource state for one or more of the prerequisites. The orchestration manager, operatively coupled to the probe manager, functions to generate a new or revised codified infrastructure based on one or more changes to the monitored dynamic resource state for the one or more prerequisites. The orchestration engine applies the change(s) identified by the orchestration engine in the newly generated codified infrastructure. The processing unit executes the new codified infrastructure.

In another aspect, a computer program product is provided to dynamically orchestrate a prerequisite driven codified infrastructure. The computer program product is provided with a computer readable storage device having embodied program code. The program code is executable by the processing unit with functionality to receive a codified infrastructure that has one or more prerequisites. The program code creates one or more probes to monitor a dynamic resource state for one or more of the prerequisites. The program code generates a new or revised codified infrastructure based on the identified one or more resources for an orchestration engine based on one or more changes to the monitored dynamic resource state for the one or more prerequisites, and applies the change(s) identified by the orchestration engine in the newly generated codified infrastructure. The program code further executes the new codified infrastructure.

In yet another aspect, a method is provided for dynamically orchestrating a prerequisite driven codified infrastructure. A codified infrastructure including one or more prerequisites is received. One or more probes are created to monitor a dynamic resource state for one or more of the prerequisites. A new codified infrastructure is generated based one or more changes to the monitored dynamic resource state for the one or more prerequisites, and the changes identified by the orchestration engine are applied in a new or revised codified infrastructure. The new or revised codified infrastructure is executed.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

DETAILED DESCRIPTION

Figure 1:
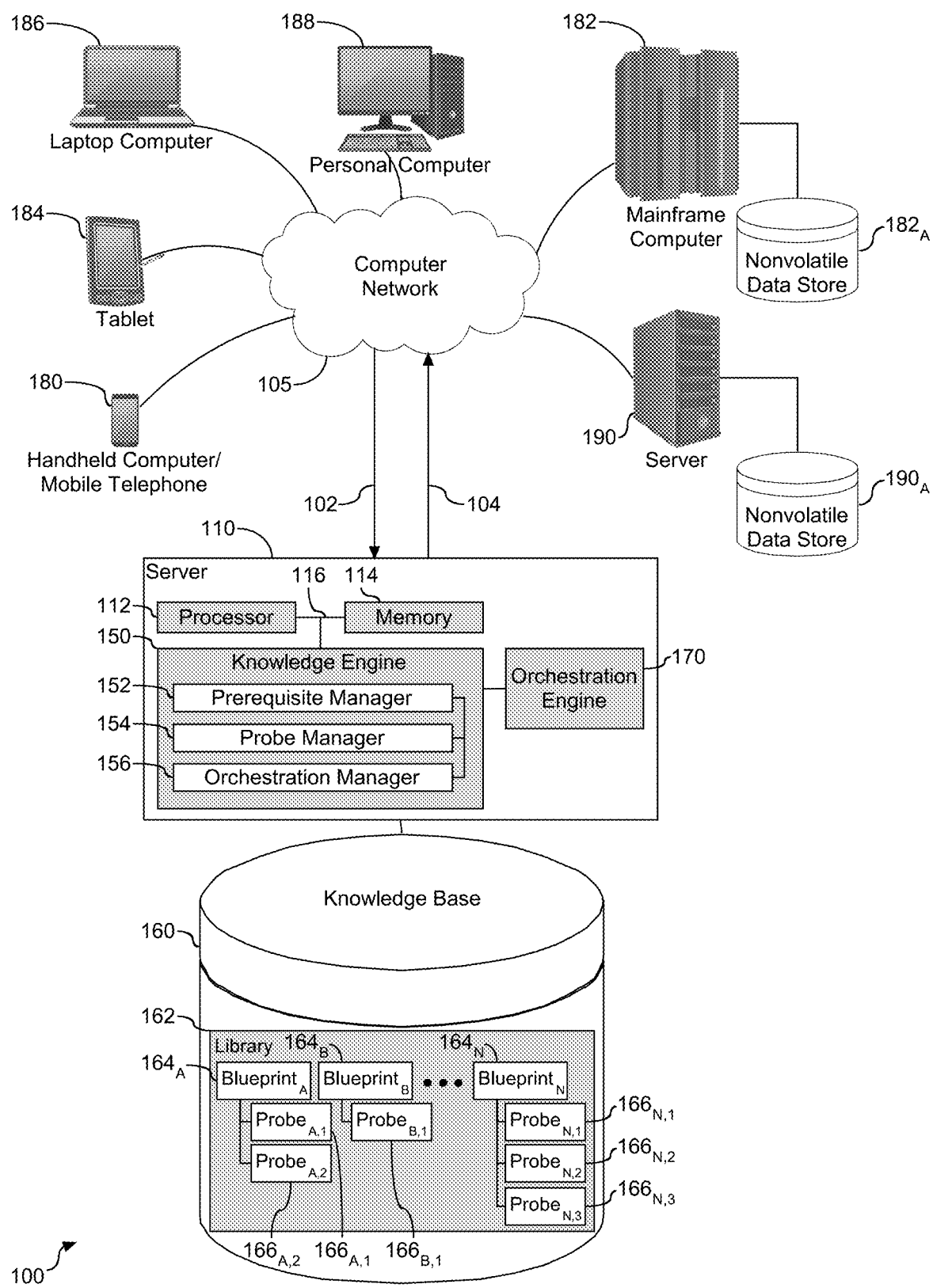
FIG. 1 depicts a system diagram illustrating a schematic diagram of a computer system and embedded tools to support dynamic orchestration of a prerequisite driven codified infrastructure.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

The blueprint describes resources that will be created and their properties, and is both human and machine readable. The blueprint enables a software architect to specify infrastructure parameters without having to write a sequence of programming commands that instruct how to create the resources. Blueprints define one or more resources to be created and define relationships and dependencies between specified resources. Dependencies can be implicitly inferred or explicitly defined. The explicitly defined dependencies between resources ensure that they are created in the correct order and each resource is uniquely named in the blueprint. Each named resource in the blueprint has its property values explicitly set to a value or implicitly set via a reference to a property from a different named resource in the blueprint or implicitly sets via a reference to an input parameter to the blueprint.

Blueprint dependencies can be nested, thereby enabling decomposition of deployment. Decomposition of the nesting is beneficial with respect to readability, re-use, and testing. Parameters in the nesting can be passed from a main blueprint to one or more nested blueprints. The nested blueprint can pass an output variable back to the main blueprint, which enables data exchange between blueprints.

Orchestration refers to management of interconnections and interactions among workloads and infrastructure. More specifically, the orchestration engine creates, configures, and instantiates computational resources, such as infrastructure, virtual machines, middleware, etc. In an embodiment, the orchestration engine interprets blueprints and uses them as patterns for cloud resources. Accordingly, the orchestration leverages blueprints to declare sources and compose solutions.

Blueprint prerequisites are logic-based dependencies and may include external requirements that are defined outside of the blueprint, and internal requirements that are defined within the blueprint. Dependencies are notations that allow a user to define which other resources must be satisfied before the next resource can begin. By their very nature, the next resource cannot be satisfied unless the prior resource upon which the dependency relies has been satisfied. A blueprint is defined with one or more prerequisites. The orchestration engine deploys resources when the defined prerequisites as indicated in the blueprint are met.

Probes are defined as processes that dynamically evaluate properties or events during deployment of resources. When a resource is launched, i.e. a virtual machine (VM) is created or a container is run, the resource will automatically activate, or spin, the probes. External events can trigger activation of probes as well. Examples of an external event include, but are not limited to, a vulnerability being detected, a database being triggered, a license becoming available, or a reaching of a milestone date on a calendar. These external events are only meant to be examples and are not to be considered limiting. Resource actions, such as the properties of resources, can also cause the activation of the probes.

Currently, translating the requirements of an infrastructure and service level requirements into complex relationships such that resources are realized when they are required is problematic. For example, a customer may know that a load balancer virtual machine (VM) must be started when at least one web server VM is started, but describing such a blueprint with prerequisites has not been realized. The method, system, and computer product described herein incorporates logical expressions, i.e. "AND", "OR", "XOR", and "REGEX", for defining use of prerequisites within blueprints.

Referring to FIG. 1, a computer system (100) is provided with tools to support dynamic blueprint interpretation and management. As shown, a server (110) is provided in communication with a plurality of computing devices (180), (182), (184), (186), (188), and (190) across a network connection (105). The server (110) is configured with a processing unit, e.g. processor, (112) operatively coupled to memory (114) across a bus (116). A tool in the form of a knowledge engine (150) is shown local to the server (110), and operatively coupled to the processing unit (112) and memory (114). As shown, the knowledge engine (150) contains one or more tools in the form of a prerequisite manager (152), a probe manager (154), and an orchestration manager (156) to provide dynamic blueprint interpretation and management over the network (105) from one or more computing devices (180), (182), (184), (186), (188), and (190). More specifically, the computing devices (180), (182), (184), (186), (188), and (190) communicate with each other and with other devices or components via one or more wires and/or wireless data communication links, where each communication link may comprise one or more of wires, routers, switches, transmitters, receivers, or the like. In this networked arrangement, the server (110) and the network connection (105) enable dynamic blueprint interpretation and management across distributed resources. Other embodiments of the server (110) may be used with components, systems, sub-systems, and/or devices other than those that are depicted herein.

The tools, including the knowledge engine (150), or in an embodiment, the tools embedded therein including the prerequisite manager (152), the probe manager (154), and the orchestration manager (156) may be configured to receive input from various sources, including but not limited to input from the network (105), and an operatively coupled knowledge base (160). In an embodiment, the knowledge base (160) includes a structure or library (162) of existing blueprints, shown herein by way of example as blueprint$_A$ (164$_A$), blueprint$_B$ (164$_B$), and blueprint$_N$ (164$_N$). The quantity of blueprints in the structure or library (162) is for illustrative purposes and should not be considered limiting. Each existing blueprint may contain one or more probes, shown herein as blueprint$_A$ (164$_A$) having probe$_{A,1}$ (166$_{A,1}$) and probe$_{A,2}$ (166$_{A,2}$), blueprint$_B$ (164$_B$) having probe$_{B,1}$ (166$_{B,1}$), and blueprint$_N$ (164$_N$) having probe$_{N,1}$ (166$_{N,1}$), probe$_{N,2}$ (166$_{N,2}$), and probe$_{N,3}$ (166$_{N,3}$). The quantity of probes in the library (162) and the quantity of probes associated with the corresponding blueprint is for illustrative purposes and should not be considered limiting.

The various computing devices (180), (182), (184), (186), and (188) in communication with the network (105) demonstrate access points for blueprint creators and blueprint users. Some of the computing devices may include devices for a database storing the corpus of data as a body of information used by the knowledge engine (150), and in an embodiment the tools (152)-(156), to support and enable prerequisite driven dynamic infrastructure orchestration of a blueprint. The network (105) may include local network connections and remote connections in various embodiments, such that the knowledge engine (150) and the embedded tools (152)-(156) may operate in environments of any size, including local and global, e.g. the Internet. Accordingly, the server (110) and the knowledge engine (150) serve as a front-end system, with the knowledge base (160) and blueprints(s) (164$_A$)-(164$_N$) serving as the back-end system.

As described in detail below, the server (110) and the knowledge engine (150) interpret and manage an executable codified infrastructure, e.g. blueprint(s). The management includes prerequisite driven orchestration of a blueprint. The knowledge engine (150) utilizes the prerequisite manager (152) to receive the executable blueprint, with the blueprint including one or more prerequisites. The prerequisites define an order of deployment of resources in the blueprint through the use of codified logical expressions. Prerequisites may include external requirements and those defined within the blueprint, e.g. internal requirements. Accordingly, the prerequisite manager (152) receives the executable codified infrastructure containing one or more prerequisites.

The probe manager (154), which is shown herein operatively coupled to the prerequisite manager (152), functions within the knowledge engine (150) to create one or more probes to monitor a dynamic resource state. More specifically, the probe manager (154) functions to create a probe to monitor a dynamic resource state for each prerequisite in the blueprint. In an embodiment, the probe manager (154) may create an individual probe to monitor a dynamic resource state for two or more prerequisites. The probes monitor the dynamic resource state to determine when the resource state has satisfied a prerequisite in the blueprint. Upon satisfaction of a prerequisite, the probe manager (154) utilizes the created probes to identify the one or more resources satisfying the prerequisites. Furthermore, the probe manager (154) utilizes the probes monitoring resources to send notifications concerning the readiness of deployed resources. The readiness can be quantified in a readiness scale that communicates the readiness of the blueprint to users or other applications. Accordingly, the probe manager (154) creates one or more probes to monitor the dynamic resource state for each resource associated with a prerequisite in the blueprint.

The orchestration manager (156), which is shown herein operatively coupled to the prerequisite manager (152) and the probe manager (154), functions to generate an executable blueprint, e.g. a new executable blueprint, based on the resources that satisfy the prerequisites, and more specifically the resource state(s) of the prerequisite(s) as monitored by a corresponding probe. The orchestration manager (156) sends the newly generated blueprint to an orchestration engine (170), shown operatively connected to the knowledge engine (150), for evaluation. The orchestration engine (170) identifies the changes between an original blueprint and the generated revised or new blueprint from the orchestration manager (156). Changes to the blueprint may be reflected in a corresponding resource, such as removal or detachment of a resource when a prerequisite is no longer met, or attachment of a resource when a prerequisite is met. For example, in an embodiment, blueprint$_A$ (164$_A$) may be an original blueprint and blueprint$_B$ (164$_B$) may be a revised or new blueprint. The orchestration manager (156) applies the identified changes to the original blueprint, which effectively and selectively revises the original blueprint, e.g. blueprint$_A$ (164$_A$), based on an occurrence of one or more prerequisites thereby creating a new blueprint, e.g. blueprint$_B$ (164$_B$). In an embodiment, resources can be dynamically deployed in response to satisfaction of a corresponding prerequisite. In response to the probe manager (154) identifying a resource satisfying a prerequisite, the orchestration manager (156) deploys a new resource corresponding to the satisfied prerequisite. In an embodiment, the orchestration manager (156) creates one or more resources in anticipation of a resource satisfying a prerequisite in a process referred to as eager provisioning, which is shown and described in detail in FIG. 5. In eager provisioning, the orchestration manager (156) creates the anticipated resource but does not attach it to the blueprint until the prerequisite is actually satisfied. In an embodiment where a resource previously accessed by the blueprint is no longer accessible, the orchestration manager (156) functions to maintain a list of backup resources and upon the resource being inaccessible, the orchestration manager (156) selects and deploys the backup resource from the list. Accordingly, the orchestration manager (156) generates a new blueprint with new deployable resources based on the satisfaction of prerequisites as identified by the probe manager (154).

Though shown as being embodied in or integrated with the server (110), the knowledge engine (150) may be implemented in a separate computing system (e.g., 190) that is connected across the network (105) to the server (110). Although shown local to the server (110), the tools (152)-(156) may be collectively or individually distributed across the network (105). Wherever embodied, the prerequisite manager (152), probe manager (154), and orchestration manager (156) are utilized to manage and support dynamically orchestrating a prerequisite driven codified infrastructure.

Codified infrastructures, i.e. blueprints, may be communicated to the server (110) across the network (105). For example, in an embodiment, one or more codified infrastructures may be communicated to the server (110) from nonvolatile data store (190$_A$). The prerequisite manager (152) processes the codified infrastructure(s), whether from the knowledge base (160) or across the network (105).

Types of information handling systems that can utilize server (110) range from small handheld devices, such as a handheld computer/mobile telephone (180) to large mainframe systems, such as a mainframe computer (182). Examples of a handheld computer (180) include personal digital assistants (PDAs), personal entertainment devices, such as MP4 players, portable televisions, and compact disc players. Other examples of information handling systems include a pen or tablet computer (184), a laptop or notebook computer (186), a personal computer system (188) and a server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store ($190_A$), and mainframe computer (182) utilizes nonvolatile data store ($182_A$). The nonvolatile data store ($182_A$) can be a component that is external to the various information handling systems or can be internal to one of the information handling systems.

An information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 2:
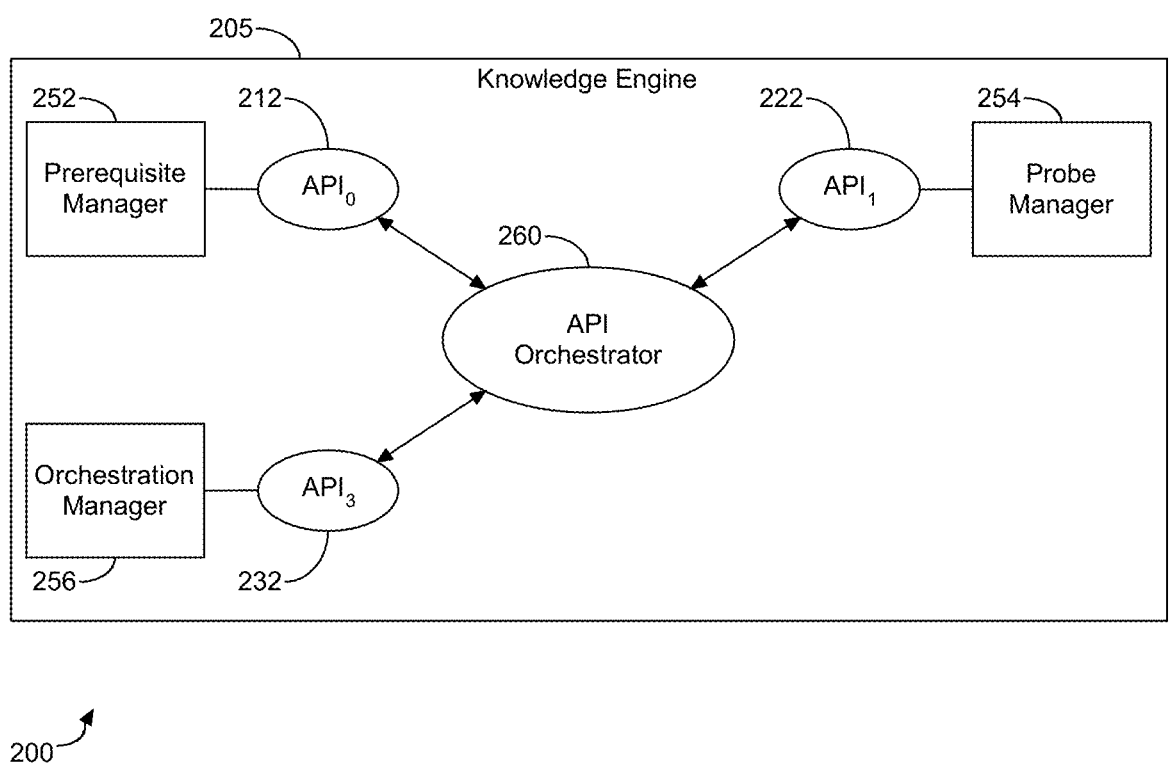
FIG. 2 depicts a block diagram a block diagram is provided illustrating the tools shown in FIG. 1 and their associated APIs.

An Application Program Interface (API) is understood in the art as a software intermediary between two or more applications. With respect to the blueprint processing system shown and described in FIG. 1, one or more APIs may be utilized to support one or more of the knowledge engine tools, including the prerequisite manager (152), the probe manager (154), and the orchestration manager (156), and their associated functionality. Referring to FIG. 2, a block diagram (200) is provided illustrating the dynamic orchestration tools and their associated APIs. As shown, a plurality of tools are embedded within the knowledge engine (205), with the tools including the prerequisite manager (252) associated with $API_0$ (212), the probe manager (254) associated with $API_1$ (222), and the orchestration manager (256) associated with $API_2$ (232). Each of the APIs may be implemented in one or more languages and interface specifications. $API_0$ (212) provides support for receipt of the codified infrastructure, e.g. blueprint; $API_1$ (222) provides support for creating one or more probes to monitor a dynamic resource state of each resource associated with a prerequisite in the blueprint; and $API_2$ (232) provides support for generating a new or revised blueprint and deploying one or more new resources based on the satisfaction of one or more prerequisites. As shown, each of the APIs (212), (222), and (232) are operatively coupled to an API orchestrator (260), otherwise known as an orchestration layer, which is understood in the art to function as an abstraction layer to transparently thread together the separate APIs. In an embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
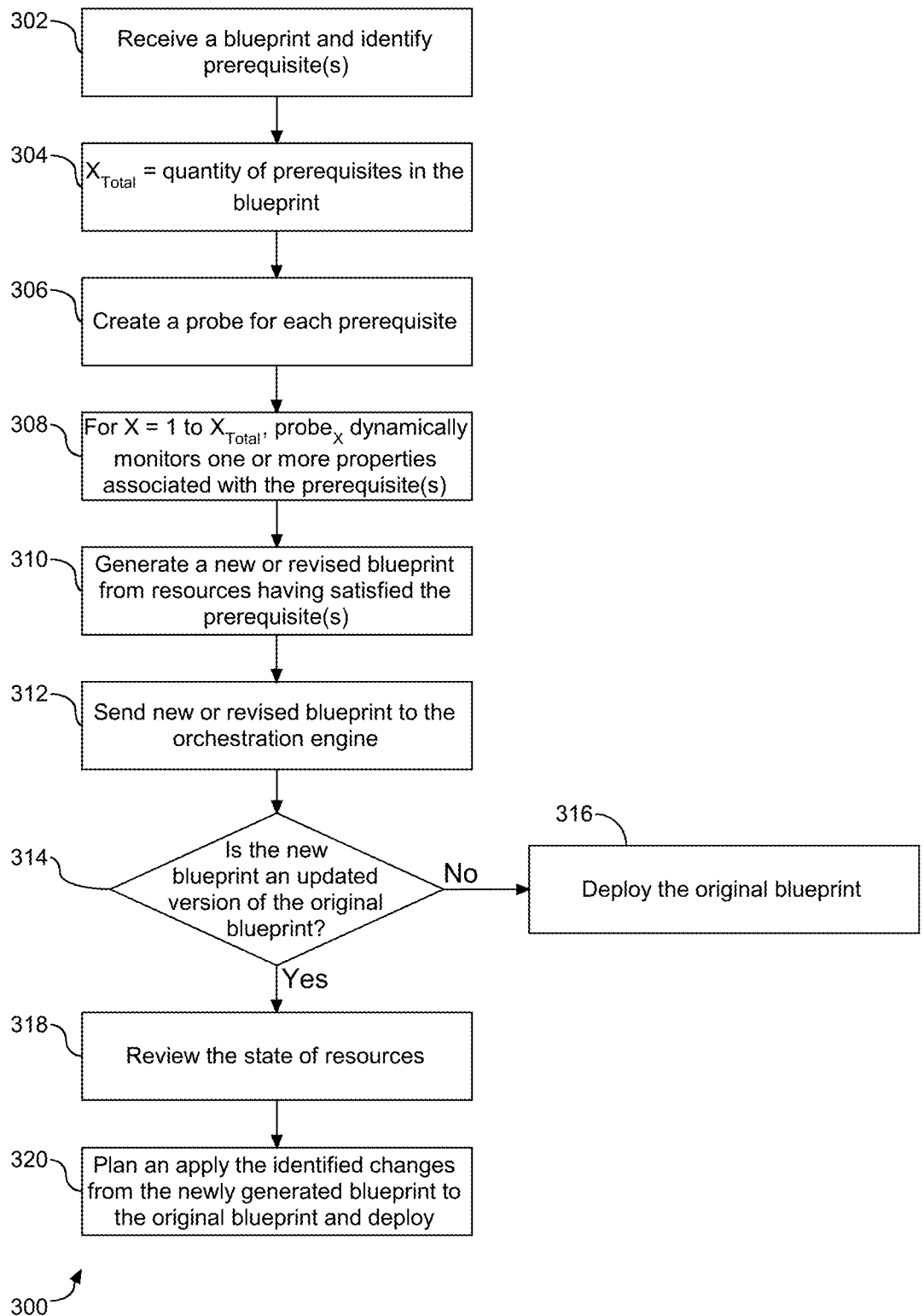
FIG. 3 depicts a flow chart to illustrate a process for prerequisite driven orchestration of a blueprint.

Referring to FIG. 3, a flow chart (300) is provided illustrating a process for prerequisite driven orchestration of a blueprint. A blueprint is received and prerequisites therein are identified (302). A prerequisite is a logic-based dependency between two or more resources. In an embodiment, the prerequisite may be user created. In an embodiment, the deployment of a second resource may be dependent on the prerequisite of a first resource being satisfied. In another embodiment, the deployment of a third resource may be dependent on the prerequisite of either a first resource or a second resource being satisfied. The variable $X_{Total}$ is assigned to represent the quantity of prerequisites identified in the received blueprint (304). In this example, a probe is created for each prerequisite (306). Please note that in an embodiment a probe might not be created for each prerequisite. For example, two or more prerequisites may be assigned to a single probe. For each prerequisite, $probe_X$ dynamically monitors and evaluates one or more properties associated with the identified prerequisites (308). A new blueprint is generated from resources having satisfied prerequisites (310). In an embodiment, the new blueprint is generated as each prerequisite is satisfied. Similarly, the new blueprint is generated with a selection of satisfied prerequisites. Accordingly, prerequisites and corresponding properties are subject to dynamic monitoring so that the blueprint may be revised or (re)-generated based on dynamic prerequisite behavior.

The newly created or revised blueprint is sent to the orchestration engine (312), and a determination is conducted to assess if the newly created or revised blueprint is an updated version of an original or prior blueprint version (314). In an embodiment, the assessment at step (314) identifies if one or more resources have been added to or detached from the original blueprint. A negative response to the determination at step (314) is an indication that newly created blueprint mirrors the originally received blueprint and there are no changes to the original blueprint, and as such the originally received blueprint is deployed (316). A positive response to the determination at step (314) is an indication that the newly created blueprint is an update to the originally received blueprint, and more specifically, the newly created blueprint contains changes from the original or prior blueprint version. The orchestration engine leverages the current state of resources so that new resources are provisioned or existing resources are re-provisioned (318) and the identified changes in the newly generated or revised blueprint are planned and applied to the originally received blueprint which is then deployed, wherein the deployment is based on the new resource provisioning or existing resource re-provisioning (320). Accordingly, probes are created to monitor one or more resource prerequisites, and a new blueprint is created or a previous blueprint is revised, with the new or revised blueprint incorporating one or more corresponding resource(s) based on the satisfaction of the monitored prerequisites.

FIG. 3 shows deploying a new resource when a prerequisite has been met. However, in an embodiment, the resource may be predefined in the blueprint, but not realized until it is required. The prerequisite can be determined dynamically as the blueprint is being used. The prerequisite can be triggered by new demands of the application over time in a process referred to herein as application driven processing. For example, in an embodiment, one or more logical expressions i.e. "AND", "OR", "XOR", and "REGEX", may be incorporated for defining or calling out the use of one or more prerequisites within the generated blueprints.

Figure 4:
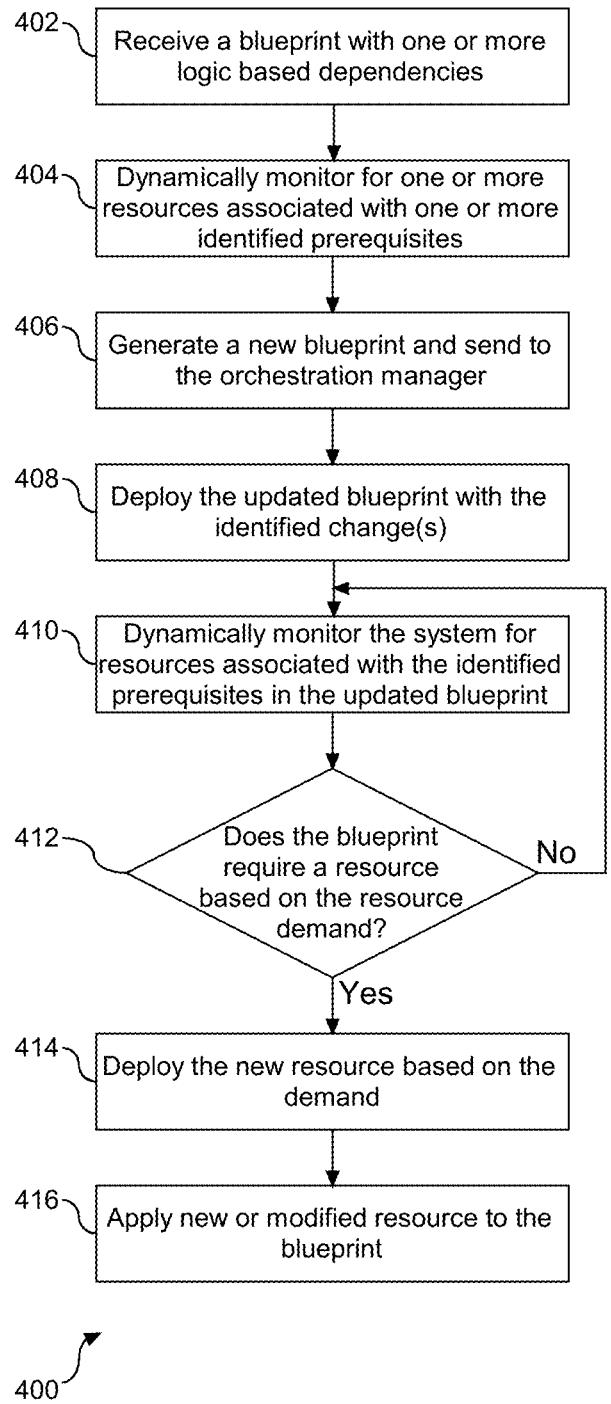
FIG. 4 depicts a flow chart to illustrate a process for application driven provisioning.

Referring to FIG. 4, a flow chart (400) is provided to illustrate application driven provisioning. A blueprint with one or more logic-based dependencies is received (402). Similar to FIG. 3, probes dynamically monitor and evaluate the system for one or more resources associated with one or more identified prerequisites (404). A newly generated blueprint based on the satisfied prerequisite(s) is sent to the orchestration manager (406), and the orchestration manager deploys the blueprint with the identified change(s) (408). The probes dynamically monitor and evaluate the system for blueprint resources and any resources associated with the identified prerequisite(s) in the newly generated or revised blueprint (410). A determination is made to ascertain if the newly generated blueprint requires one or more new resources based on a resource demand, or downgrading, removing, or detaching one or more resources when prerequisites are no longer met (412). A negative response to the determination at step (412) indicates that there is no demand for additional resources for the blueprint and the process returns to step (410) for further resource monitoring. A positive response to the determination at step (412) indicates that a new resource is needed and the new resource is identified and deployed based on the demand (414). In an embodiment, instead of a new resource being deployed at step (414), an existing resource of the originally received blueprint may be modified. For example, an infrastructure may be provisioned with two processes on one container. When demand on the infrastructure is excessive, instead of deploying a new resource, the existing resource can be modified by splitting the container into two copies. One copy of the container is configured to run the first process and the other copy of the container is configured to run the second process. Similarly, in an embodiment, a resource may or must be removed from the original or prior version of the blueprint when one or more prerequisites are no longer met. Following step (414), the new or modified resource is applied to the blueprint (416) and the process returns step (406) with the blueprint being sent to the orchestration engine. Accordingly, the probes monitor resource demands to determine if new resources are to be deployed or existing resources need to be modified to meet demand or any resources need to be downgraded, removed or detached when prerequisites are no longer met.

Certain resources in a blueprint may not be needed before a certain condition is achieved by the application. A process referred to herein as eager provisioning creates these resources but does not attach them to the blueprint until they are needed. Once the condition in the blueprint is satisfied or met, the resource is attached to the blueprint. An example of eager provisioning is where a virtual machine is launched with application "A" installed but application "A" is not executable. Prior to the virtual machine being launched the user provides their license number. Once the license is provided and verified or authenticated, the virtual machine is provided, and the preinstalled application "A" is opened.

Figure 5:
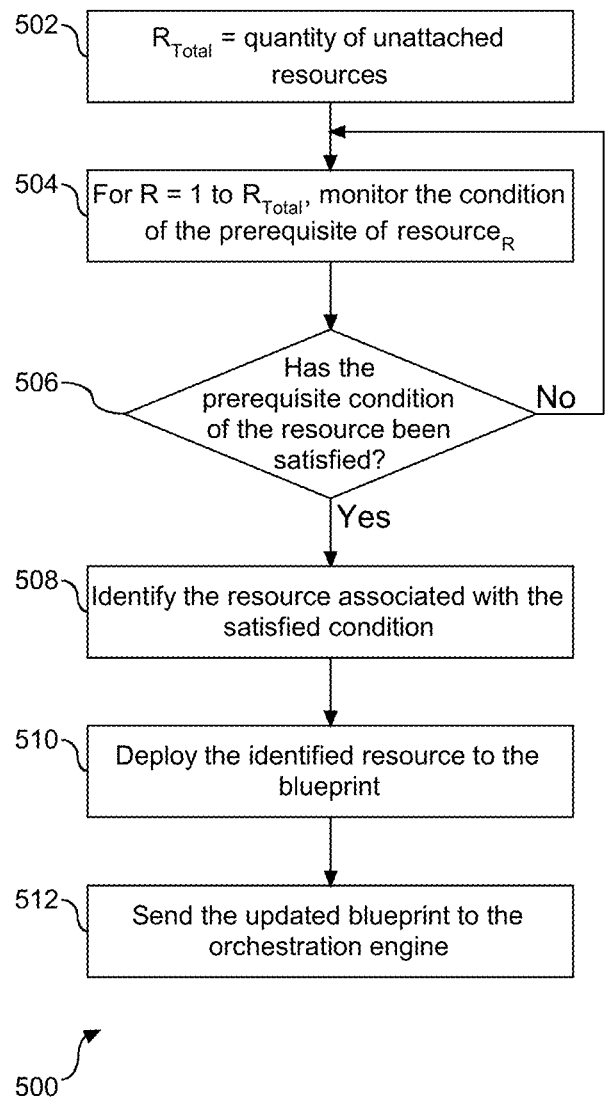
FIG. 5 depicts a flow chart to illustrate a process for eager provisioning of resources of a blueprint.

Referring to FIG. 5, a flow chart (500) is provided to illustrate eager provisioning of one or more blueprint resources. The quantity of resources that are created and not attached to the blueprint is assigned to the variable $R_{Total}$ (502). For each resource$_R$, the condition of the resource in the application is monitored (504). It is then determined if the condition of any of the resources, e.g. $R_{Total}$, has been met (506). In an embodiment, the condition of multiple resource conditions can be satisfied at step (506). A negative response to the determination at step (506) returns the process to step (504) for further monitoring. A positive response to the determination to step (504) indicates that a condition of at least one resource$_R$ has been met and the resource is identified (508). The identified resource is deployed to the blueprint to create an updated blueprint (510), and the updated blueprint is sent to the orchestration manager (512). Accordingly, eager provisioning allows for a resource for an application to be created and only attached to the application when a condition for the resource demand is met.

In another embodiment a virtual machine is deployed with resource "A". Resource "A" then fails. A process referred to herein as failure based provisioning dependency allows for resource "B" to be deployed in place of resource "A" where resource "B" is a new resource type. In the following example of failure based provisioning dependency an application is deployed with a resource that is a geolocation finder API service. If the service fails, i.e. no longer responds, a new API service resource is deployed that is that has similar functionality as the failed service but is from a different provider.

Figure 6:
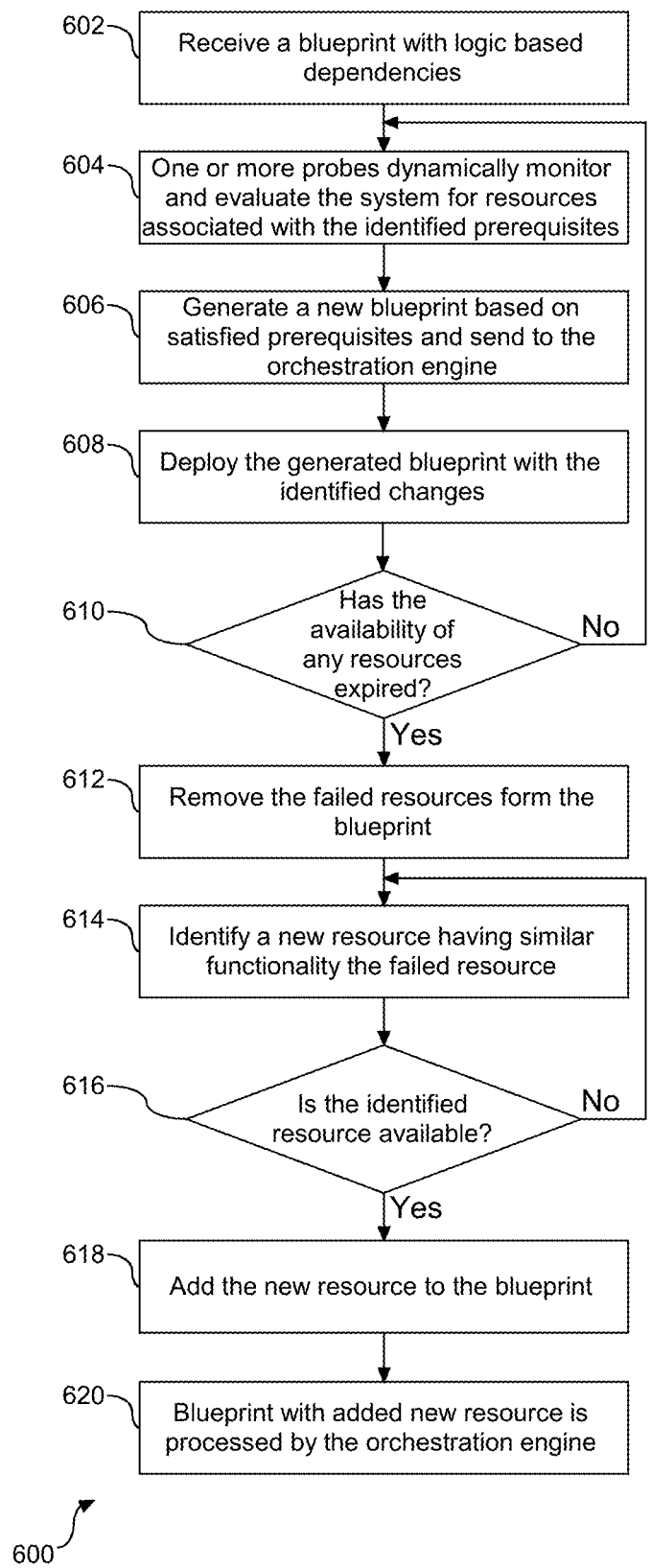
FIG. 6 depicts a flow chart to illustrate a process for failure based provisioning dependency to the blueprint environment.

Referring to FIG. 6, a flow chart (600) is provided to illustrate failure based provisioning dependency to the blueprint environment. As shown, a blueprint with logic-based dependencies is received (602). Similar to FIG. 4, probes dynamically monitor and evaluate the system for resources associated with the identified prerequisites (604), a newly generated blueprint based on the satisfied prerequisites is sent to the orchestration manager (606), and the orchestration manager deploys the newly generated blueprint with the identified changes (608). A determination is made if the availability of any resources defined in the newly generated blueprint has expired (610). A negative response to the determination at step (610) indicates that all of the resources in the blueprint are still available and the process returns to step (604). A positive response to the determination at step (610) indicates that at least one resource within the blueprint is no longer available or failed, and the indicated one or more resources are removed from the blueprint (612).

Following step (612), a new resource is identified that has similar functionality to the failed resource(s) that has been effectively removed from the blueprint (614). A determination is then made if the identified new resource is available (616). A negative response to the determination indicates that the newly identified resource is not available and the process returns to step (614) to identify another possible new resource to replace the failed resource. Similarly, a positive response to the determination at step (616) indicates that the newly identified resource is available and the new resource is added to the blueprint (618). The blueprint with the new resource is then processed by the orchestration engine (620). The process then returns to step (604) and the resources of the blueprint are continued to be evaluated for availability. Accordingly, one or more blueprint resources may be subject to monitoring and selectively replaced with a new available resource that has a similar functionality to the failed resource.

Figure 7:
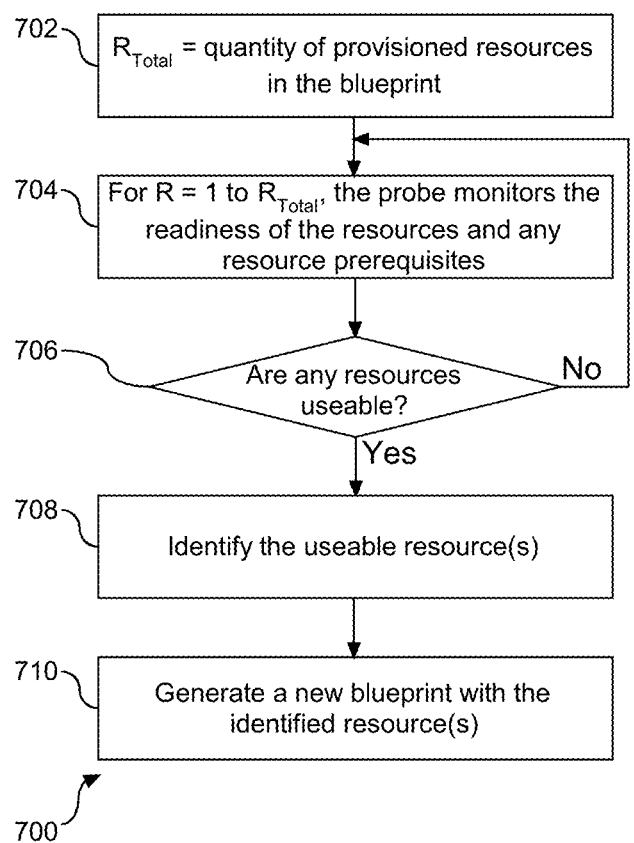
FIG. 7 depicts a flow chart to illustrate a process for a blueprint readiness declaration.

As the blueprint is provisioned, a probe watches and sends notifications concerning the readiness of the blueprint to users or other applications. This readiness scale can notify the user or another application of the usability of the blueprint. The readiness of a blueprint can be input to other dependencies, such that a resource can be dependent upon the readiness of a blueprint before the resource can be deployed. Referring to FIG. 7, a flow chart (700) is provided to illustrate a blueprint readiness declaration. The variable $R_{Total}$ is assigned to the quantity of provisioned resources in the blueprint (702). For each provisioned resource$_R$ in the blueprint, a probe monitors the readiness of the resource and any resource prerequisite(s) (704). A determination is then made if any resources are useable based on the monitored readiness (706). A negative response to the determination at step (706) indicates that there are no useable resources available and the process returns to step (704) for further monitoring. A positive determination to step (706) indicates that there is at least one useable resource present and the resource is identified (708). A new blueprint is then generated with the identified resource (710) similar to the process shown and described in FIG. 3. Accordingly, a readiness scale is employed to communicate the readiness of a blueprint and the provisioned resources.

With references to FIG. 8, a block diagram (800) is provided illustrating an example of a computer system/server (802), hereinafter referred to as a host (802) in communication with a cloud based support system, to implement the system and processes described above with respect to FIGS. 1-7. Host (802) is operational with numerous other general purpose or special purpose computing system environments or configurations. Examples of well-known computing systems, environments, and/or configurations that may be suitable for use with host (802) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (802) may be described in the general context of computer system-executable instructions, such as program modules, being executed by a computer system. Generally, program modules may include routines, programs, objects, components, logic, data structures, and so on that perform particular tasks or implement particular abstract data types. Host (802) may be practiced in distributed cloud computing environments (810) where tasks are performed by remote processing devices that are linked through a communications network. In a distributed cloud computing environment, program modules may be located in both local and remote computer system storage media including memory storage devices.

Figure 8:
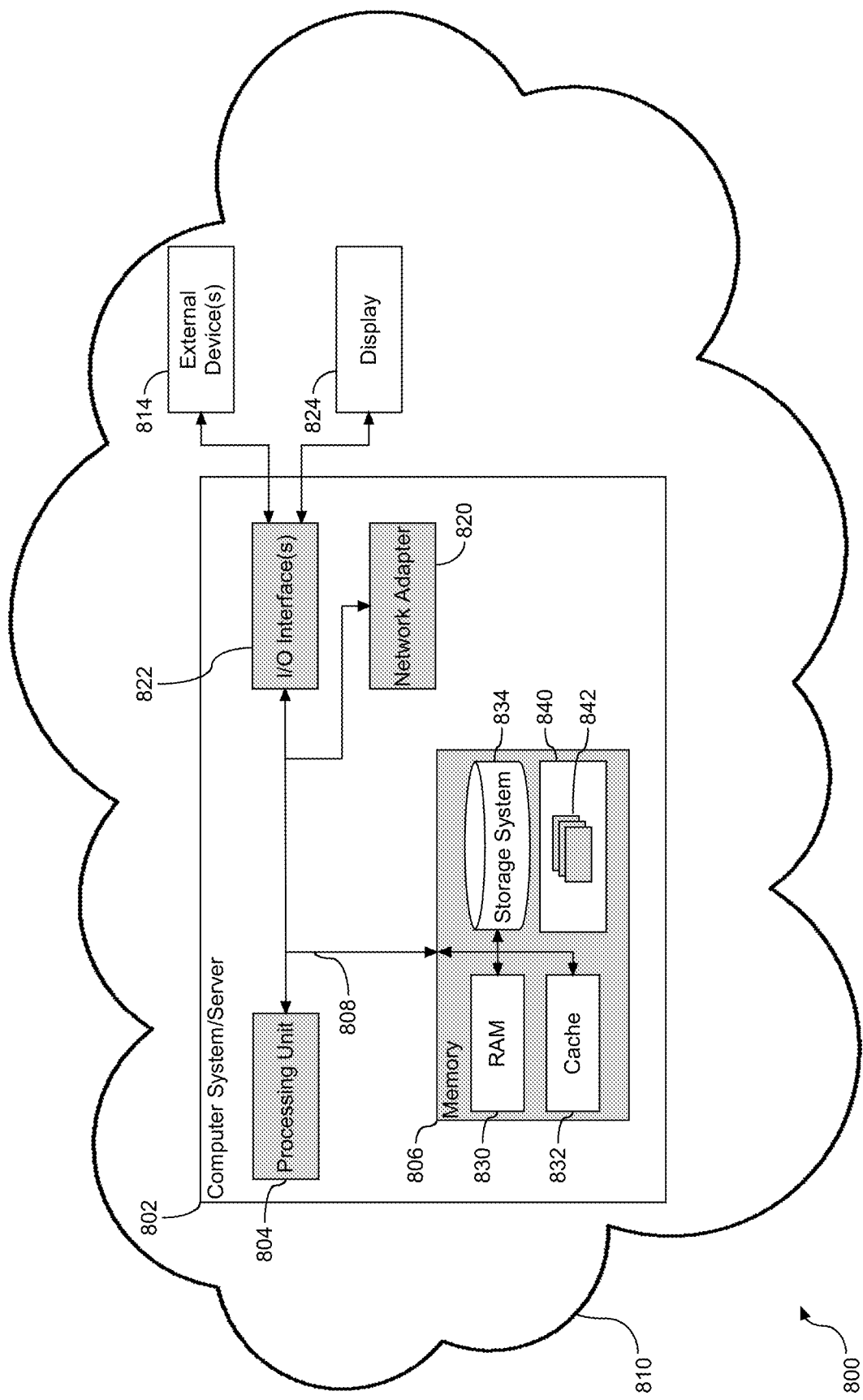
FIG. 8 is a block diagram depicting an example of a computer system/server of a cloud based support system, to implement the system and processes described above with respect to FIGS. 1-7.

As shown in FIG. 8, host (802) is shown in the form of a general-purpose computing device. The components of host (802) may include, but are not limited to, one or more processors or processing units (804), a system memory (806), and a bus (808) that couples various system components including system memory (806) to processor (804). Bus (808) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (802) typically includes a variety of computer system readable media. Such media may be any available media that is accessible by host (802) and it includes both volatile and non-volatile media, removable and non-removable media.

Memory (806) can include computer system readable media in the form of volatile memory, such as random access memory (RAM) (830) and/or cache memory (832). By way of example only, storage system (834) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (808) by one or more data media interfaces.

Program/utility (840), having a set (at least one) of program modules (842), may be stored in memory (806) by way of example, and not limitation, as well as an operating system, one or more application programs, other program modules, and program data. Each of the operating systems, one or more application programs, other program modules, and program data or some combination thereof, may include an implementation of a networking environment. Program modules (842) generally carry out the functions and/or methodologies of embodiments of the adversarial training and dynamic classification model evolution. For example, the set of program modules (842) may include the modules configured as the tools (152)-(156) described in FIG. 1.

Host (802) may also communicate with one or more external devices (814), such as a keyboard, a pointing device, a sensory input device, a sensory output device, etc.; a display (824); one or more devices that enable a user to interact with host (802); and/or any devices (e.g., network card, modem, etc.) that enable host (802) to communicate with one or more other computing devices. Such communication can occur via Input/Output (I/O) interface(s) (822). Still yet, host (802) can communicate with one or more networks such as a local area network (LAN), a general wide area network (WAN), and/or a public network (e.g., the Internet) via network adapter (820). As depicted, network adapter (820) communicates with the other components of host (802) via bus (808). In an embodiment, a plurality of nodes of a distributed file system (not shown) is in communication with the host (802) via the I/O interface (822) or via the network adapter (820). It should be understood that although not shown, other hardware and/or software components could be used in conjunction with host (802). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (806), including RAM (830), cache (832), and storage system (834), such as a removable storage drive and a hard disk installed in a hard disk drive.

Computer programs (also called computer control logic) are stored in memory (806). Computer programs may also be received via a communication interface, such as network adapter (820). Such computer programs, when run, enable the computer system to perform the features of the present embodiments as discussed herein. In particular, the computer programs, when run, enable the processing unit (804)

to perform the features of the computer system. Accordingly, such computer programs represent controllers of the computer system.

In an embodiment, host (802) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 9:
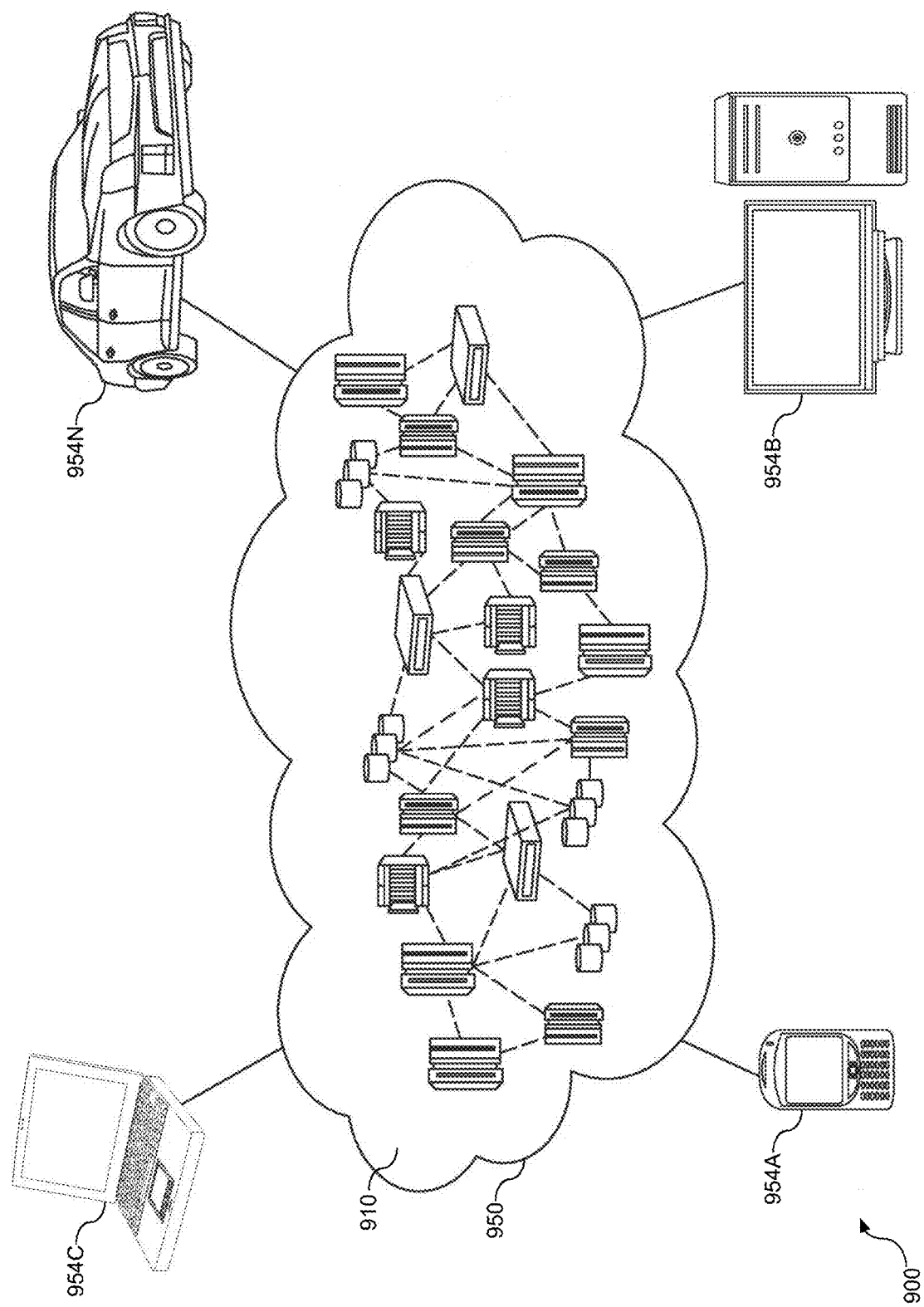
FIG. 9 depicts a block diagram illustrating a cloud computer environment.

Referring now to FIG. 9, an illustrative cloud computing network (900). As shown, cloud computing network (900) includes a cloud computing environment (950) having one or more cloud computing nodes (910) with which local computing devices used by cloud consumers may communicate. Examples of these local computing devices include, but are not limited to, personal digital assistant (PDA) or cellular telephone (954A), desktop computer (954B), laptop computer (954C), and/or automobile computer system (954N). Individual nodes within nodes (910) may further communicate with one another. They may be grouped (not shown) physically or virtually, in one or more networks, such as Private, Community, Public, or Hybrid clouds as described hereinabove, or a combination thereof. This allows cloud computing environment (900) to offer infrastructure, platforms and/or software as services for which a cloud consumer does not need to maintain resources on a local computing device. It is understood that the types of computing devices (954A-N) shown in FIG. 9 are intended to be illustrative only and that the cloud computing environment (950) can communicate with any type of computerized device over any type of network and/or network addressable connection (e.g., using a web browser).

Figure 10:
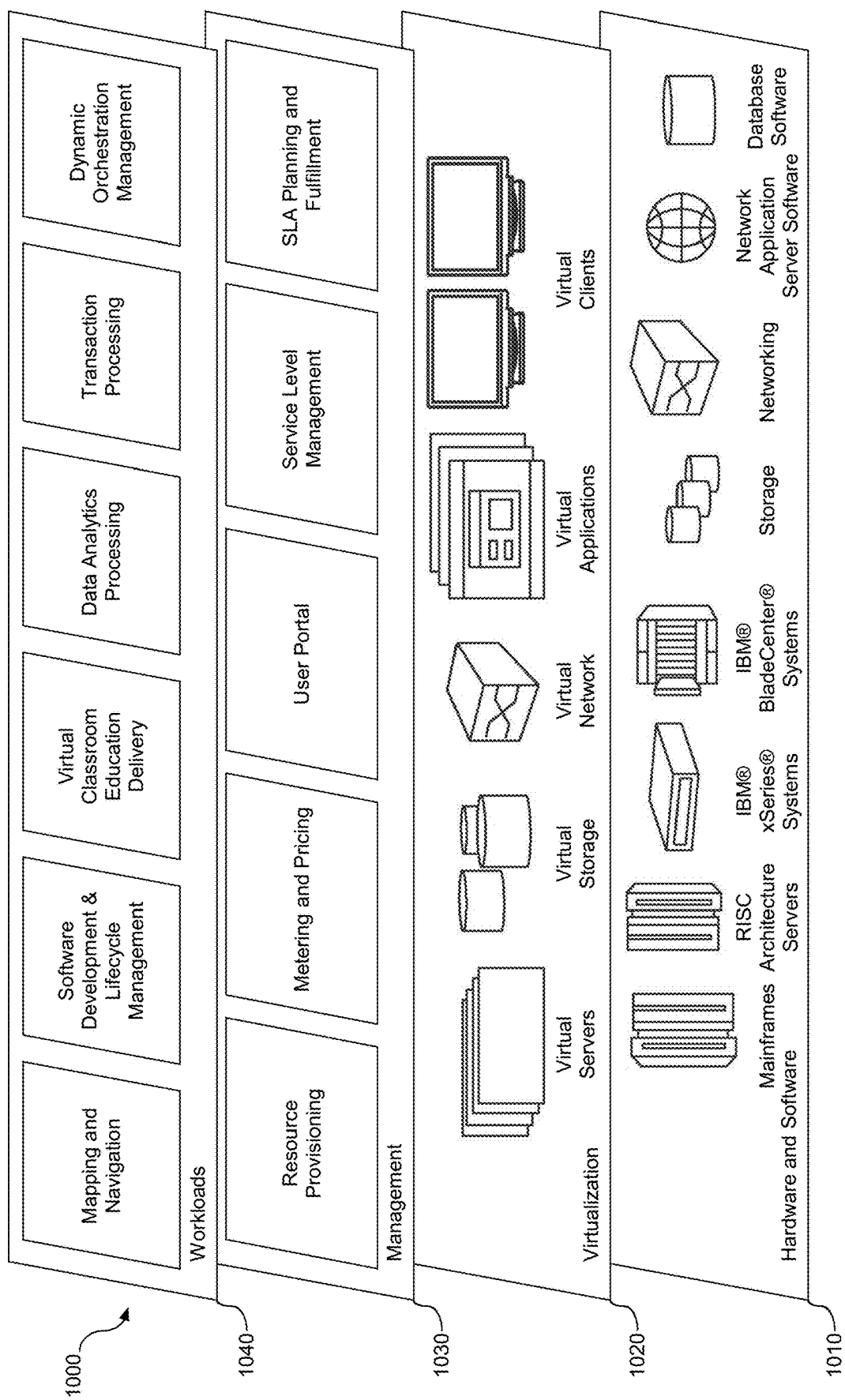
FIG. 10 depicts a block diagram illustrating a set of functional abstraction model layers provided by the cloud computing environment.

Referring now to FIG. 10, a set of functional abstraction layers (1000) provided by the cloud computing network of FIG. 9 is shown. It should be understood in advance that the components, layers, and functions shown in FIG. 10 are intended to be illustrative only, and the embodiments are not limited thereto. As depicted, the following layers and corresponding functions are provided: hardware and software layer (1010), virtualization layer (1020), management layer (1030), and workload layer (1040). The hardware and software layer (1010) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1020) provides an abstraction layer from which the following examples of virtual entities may be provided: virtual servers; virtual storage; virtual networks, including virtual private networks; virtual applications and operating systems; and virtual clients.

In one example, management layer (1030) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides prearrangement for, and procurement of, cloud computing resources for which a future requirement is anticipated in accordance with an SLA.

Workloads layer (1040) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and codified infrastructure dynamic orchestration management.

The system and flow charts shown herein may also be in the form of a computer program device for dynamically orchestrating a prerequisite driven codified infrastructure. The device has program code embodied therewith. The program code is executable by a processing unit to support the described functionality.

While particular embodiments have been shown and described, it will be obvious to those skilled in the art that, based upon the teachings herein, changes and modifications may be made without departing from its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to the embodiments containing only one such element, even when the same claim includes the introductory phrases "one or more" or "at least one" and indefinite articles such as "a" or "an"; the same holds true for the use in the claims of definite articles.

The present embodiment(s) may be a system, a method, and/or a computer program product. In addition, selected aspects of the present embodiment(s) may take the form of an entirely hardware embodiment, an entirely software embodiment (including firmware, resident software, microcode, etc.) or an embodiment combining software and/or hardware aspects that may all generally be referred to herein as a "circuit," "module" or "system." Furthermore, aspects of the present embodiment(s) may take the form of computer program product embodied in a computer readable storage medium (or media) having computer readable program instructions thereon for causing a processor to carry out aspects of the present embodiment(s). Thus embodied, the disclosed system, a method, and/or a computer program product are operative to improve the functionality and operation of dynamical orchestration of a prerequisite driven codified infrastructure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiment(s) may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiment(s).

Aspects of the present embodiment(s) are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiment(s). In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiment(s). In particular, the codified infrastructure, including the dynamic orchestration of a prerequisite driven codified infrastructure may be carried out by different computing platforms or across multiple devices. Furthermore, the data storage and/or corpus may be localized, remote, or spread across multiple systems. Accordingly, the scope of protection of the embodiment(s) is limited only by the following claims and their equivalents.

What is claimed is:

1. A computer system comprising:
   a processing unit operatively coupled to memory;
   a knowledge engine operatively coupled to the processing unit, the knowledge engine configured with one or more tools to orchestrate an executable codified infrastructure based on one or more prerequisite driven logic based dependencies, the tools comprising:
      a prerequisite manager to receive the executable codified infrastructure, the codified infrastructure including one or more prerequisites;
      a probe manager operatively coupled to the prerequisite manager, the probe manager to create one or more probes to monitor a dynamic resource state for the one or more prerequisites;
      an orchestration manager operatively coupled to the probe manager, the orchestration manager to generate a new executable codified infrastructure for an orchestration engine based on one or more changes to the monitored dynamic resource state for the one or more prerequisites; and
      the orchestration manager to apply changes identified by the orchestration engine in the new codified infrastructure; and
   the processing unit to execute the new codified infrastructure.

2. The system of claim 1, wherein identifying one or more resources satisfying the one or more prerequisites includes dynamically deploying the identified one or more resources in response to satisfaction of a corresponding prerequisite.

3. The system of claim 1, further comprising the orchestration manager to selectively revise the codified infrastructure, including the orchestration manager to create one or more resources detached from the infrastructure, wherein the selective revision of the new codified infrastructure attaches one or more of the detached resources responsive to meeting a resource condition.

4. The system of claim 1, wherein identifying one or more resources satisfying the one or more prerequisites includes failure based provisioning, including deploying a select resource as a replacement of a failed resource, wherein the deployed select resource has comparable functionality to the failed resource.

5. The system of claim 1, further comprising the probe manager to send one or more notifications, by the one or more created probes, concerning a readiness of deployment of one or more resources, wherein the readiness is quantified in a readiness scale, the readiness scale communicating usability of the executable codified infrastructure.

6. The system of claim 1, further comprising the orchestration manager to maintain one or more backup resources, wherein upon satisfaction of the prerequisite a deployable resource is unavailable, a backup resource is selected and deployed.

7. The system of claim 1, wherein the one or more prerequisites define an order of deployment of resources through the use of one or more codified logic expressions.

8. A computer program product to orchestrate an executable codified infrastructure based on prerequisite driven logic based dependencies, the computer program product comprising a computer readable storage medium having program code embodied therewith, the program code executable by a processor to:
receive an executable codified infrastructure, the codified infrastructure including one or more prerequisites;
create one or more probes to monitor a dynamic resource state for the one or more prerequisites;
generate a new executable codified infrastructure for an orchestration engine based on one or more changes to the monitored dynamic resource state for the one or more prerequisites;
apply changes identified in the new codified infrastructure by the orchestration engine; and
execute the new codified infrastructure.

9. The computer program product of claim 8, wherein identifying one or more resources satisfying the one or more prerequisites includes dynamically deploying the identified one or more resources in response to satisfaction of a corresponding prerequisite.

10. The computer program product of claim 8, further comprising program code to apply eager provisioning to selectively revise the codified infrastructure, including the program code to create one or more resources detached from the infrastructure, wherein the selective revision of the new codified infrastructure attaches one or more of the detached resources responsive to meeting a resource condition.

11. The computer program product of claim 8, wherein identifying one or more resources satisfying the one or more prerequisites includes failure based provisioning, including deploying a select resource as a replacement of a failed resource, wherein the deployed select resource has comparable functionality to the failed resource.

12. The computer program product of claim 8, further comprising the program code to send one or more notifications, by the one or more created probes, concerning a readiness of deployment of one or more resources, wherein the readiness is quantified in a readiness scale, the readiness scale communicating usability of the executable codified infrastructure.

13. The computer program product of claim 8, further comprising the program code to maintain one or more backup resources, wherein upon satisfaction of the prerequisite a deployable resource is unavailable, a backup resource is selected and deployed.

14. The computer program product of claim 8, wherein the one or more prerequisites define an order of deployment of resources through the use of one or more codified logic expressions.

15. A method comprising:
receiving an executable codified infrastructure, the codified infrastructure including one or more prerequisites;
creating one or more probes to monitor a dynamic resource state for the one or more prerequisites;
generating a new executable codified infrastructure for an orchestration engine based on one or more changes to the monitored dynamic resource state for the one or more prerequisites;
applying changes identified in the new codified infrastructure by the orchestration engine; and
executing the new codified infrastructure.

16. The method of claim 15, wherein the one or more prerequisites define an order of deployment of resources through the use of one or more codified logic expressions.

17. The method of claim 15, further comprising applying eager provisioning to selectively revise the codified infrastructure, including creating one or more resources detached from the infrastructure, wherein the selective revision of the new codified infrastructure attaches one or more of the detached resources responsive to meeting a resource condition.

18. The method of claim 15, wherein identifying one or more resources satisfying the one or more prerequisites includes failure based provisioning, including deploying a select resource as a replacement of a failed resource, wherein the deployed select resource has comparable functionality to the failed resource.

19. The method of claim 15, further comprising sending one or more notifications, by the one or more created probes, concerning a readiness of deployment of one or more resources, wherein the readiness is quantified in a readiness scale, the readiness scale communicating usability of the executable codified infrastructure.

20. The method of claim 15, further comprising maintaining one or more backup resources, wherein upon satisfaction of the prerequisite a deployable resource is unavailable, a backup resource is selected and deployed.

* * * * *